United States Patent Office 3,169,189
Patented Feb. 9, 1965

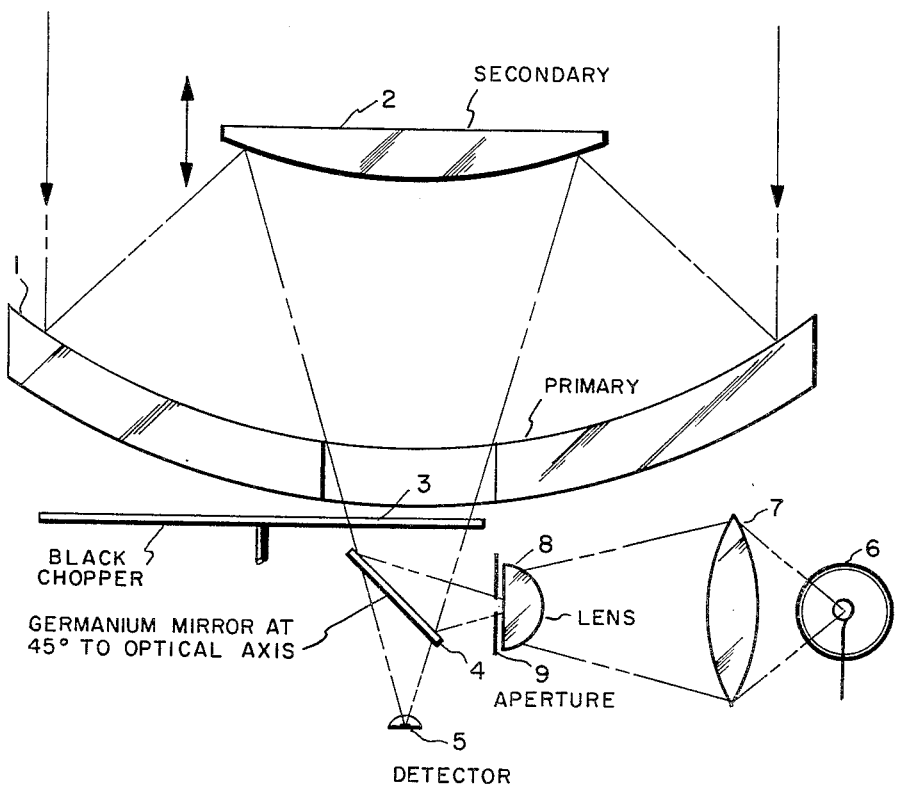

3,169,189
INFRARED THERMOGRAPH
Robert Bowling Barnes, Stamford, and Maggio Charles Banca and Nelson E. Engborg, Old Greenwich, Conn., assignors to Barnes Engineering Company, Stamford, Conn., a corporation of Delaware
Filed Apr. 11, 1963, Ser. No. 272,396
3 Claims. (Cl. 250—83.3)

This invention relates to an improved infrared thermograph or camera for the production of thermograms, that is to say heat pictures produced by the self radiation of the object in the infrared.

Infrared thermographs have achieved success in many fields. The first successful commercial instrument is described in the Astheimer and Wormser Patent 2,895,049, July 14, 1959. In this instrument an infrared detector is scanned across the scene of which a thermogram is desired. The optics shown are a Cassegrain mirror and the scanning is effected by a plane mirror which oscillates horizontally and changes its vertical inclination either continuously or intermittently at the end of each horizontal scan. In other words, the infrared detector is scanned across the scene in the form of a raster which resembles the low resolution rasters of early television transmissions. Customarily the raster has 200 lines instead of the 500 plus lines of modern television. The optics include a focusing objective which is frequently a Cassegrain mirror with movable secondary and there is provided a thermostated reference source or black body and a chopper which is rotated at a suitable chopping frequency, for example 20 or 30 c.p.s., the blades of the chopper interrupting the beam from the scene which is being thermographed and having reflective backs which reflect radiation from the black body source onto the detector whenever a blade passes. Suitable electronics provide a differential output signal in which the radiation from the scene is compared with the black body source at chopping frequency. The output of the electronics is then used to modulate a light source such as a glow tube or other light source which is capable of responding to the chopping frequency. This light source is scanned across a suitable recording surface such as a photographic film, for example by using a mirror mounted on the main scanning mirror. Accordingly, there is produced on the photographic surface a reproduction of the infrared output in shades of black and white.

In order to determine what temperature is represented by different gradations of color there is also provided an internal gray scale generator which modulates the glow tube for a few lines, for example eight, at an edge of the picture. The modulation is in a form of steps so that there results a narrow gray scale raster of different degrees of whiteness ranging from black to white. Controls are also provided in the electronics for establishing the average level of the thermogram and for determining the range of temperatures which correspond to the steps of the gray scale. These two controls may be thought of as analogous to brightness and contrast controls in a television receiver.

In a practical commercial machine it is normally desirable to provide for some indication on the scene to show what part of the scene is being scanned. Customarily this has been effected by providing a light source which produces a flying spot by means of the scanning mirror. Visual observation of the moving spot shows the portion of the scene which is being included in the thermogram produced. This spot is ordinarily produced by a beam entering the Cassegrain optics and presents certain problems because it is necessary that the spot light source be inside the thermograph at a point where it is difficult to replace and focus a burned out bulb without considerable dismantling of the instrument. The moving spot of light is not described in the Astheimer and Wormser patent which are directed to the basic elements of producing a thermogram.

The present invention relates to improvements in the reference source and in the production of the flying spot and focusing of the optics of the thermograph. The mechanism for scanning is not affected by the present invention which can be used with any scanning system and is, therefore, not limited to the oscillating and nutating plane mirror system employed in the Astheimer and Wormser patent.

Primarily the present invention involves a different placement and organization of elements for forming the flying spot which permit extremely precise visual focusing by the same flying spot which is more precise and more readily effected than the focusing of the optics in the original thermograph. In a more specific modification the invention also includes an ambient temperature reference chopping source thereby eliminating the need for a thermostated black body. Although, of course, the novel means for producing the flying spot and for effecting visual focusing can be used in a thermograph which has a black body reference source the invention will be described in connection with a description of the drawings which constitute an optical diagram of the portion of the thermograph optics involving the present invention.

In describing the operation of the present invention the same kind of optics will be described as are used in the thermograph of the Astheimer and Wormser patent. The essential components of the optical system comprise a primary Cassegrain mirror 1 and a movable secondary mirror 2, the latter being used for focusing as is indicated by the double arrow. Since the mechanical elements moving the secondary mirror are not changed by the present invention they are not shown.

Infrared radiation from the Cassegrain mirror passes through a chopper 3 which is rotated by a conventional synchronous motor (not shown). The chopper, however, is different from that used in the Astheimer and Wormser patent in that instead of having the back of its blades formed as reflecting surfaces the backs are blackened and constitute therefore a black body source at ambient temperature. The infrared radiation from the scene to be thermographed then passes through an inclined, very thin germanium plate 4. This plate constitutes a dichroic mirror passing infrared radiation of wavelength longer than about $1.8\mu$ and reflecting visible light. Behind the germanium plate 4 is an infrared detector 5 which is shown diagrammatically as a conventional immersed thermistor bolometer such as is illustrated for example in FIG. 7 of the Wormser Patent 2,983,888, May 9, 1961. The output of the infrared detector is processed by electronic circuits which are not shown as they are the same as those in the Astheimer and Wormser patent and the output of the circuits modulates a glow tube or other light source which is scanned across a photographic film in step with the scanning of the detector across the scene to be thermographed. This is as described above and since the scanning mechanisms are not in any way changed by the present invention the scanning elements are also not shown.

A flying spot is produced by a lamp 6 which is preferably provided with a suitable conventional dimming rheostate (not shown). The beam from the lamp 6 is then condensed by lenses 7 and 8 onto an aperture mask 9 provided with a small aperture. The beam has a divergence equal to the convergence of the beam striking the detector. The beam then strikes the dichroic mirror 4 at 45° to the beam to the infrared detector 5 and the visible portion of the light is reflected out through the thermograph optics. The aperture plate 9 is at the same distance from the dichroic mirror 4 as is the detector 5 and, therefore, when the flying spot from the light beam is sharply focused in the plane of the scene to be thermographed so is the detector 5. In other words, if the optics of the thermograph are focused so that a small, sharp, bright spot is produced in the plane of a scene to be thermographed the whole thermograph is sharply focused on this plane. This initial focusing is done with the scanning mechanism motionless and can be effected with extreme precision as the eye can distinguish the point at which a tiny spot of light is sharply focused with extreme accuracy. The focusing elements and the flying spot, therefore, serve dual functions without adding further elements and increase quite markedly the precision with which the thermograph can be focused.

When the instrument is in sharp focus the intensity of the light beam from the lamp 6 is reduced, for example by lowering the voltage on its filament, and the scanning is started. The spot of light which now becomes a flying spot scanned across the scene is a sufficiently dim yellow so that it does not constitute an annoyance if the instrument is used to produce a thermogram of a human being including the face. If the intensity of the light beam had been maintained at the high point used for sharp focusing this would be annoying. The simplest way to change the intensity of the light beam is by changing the voltage on the lamp but, of course, any other means such as a variable iris diaphragm may be used.

It will be noted that the lamp and its associated optics are outside of the main optics of the camera and at a position where lamp bulbs can be changed without dismantling any of the instrument. This is a marked practical advantage which was not hitherto obtainable and combined with a simultaneous focusing of bright spot and infrared detector onto the scene makes an instrument which can be used with extreme precision and by relatively only moderately skilled personnel. The former focusing required measurement or reading of meters and necessitated more knowledge than is required to determine when a light spot is sharply focused. This possibility of using relatively unskilled personnel is a further economic advantage where the thermograph is not continuously used as it makes unnecessary to employ full time highly skilled personnel which were necessary with the former designs of infrared thermographs.

It will be noted that the backs of the chopper blades 3 constitute a reference source against which incoming infrared radiation is compared. This source is not maintained absolutely constant at a predetermined temperature as was the case with thermostated black bodies. It is desirable to eliminate the black body not only for the marked savings in cost, power consumption and added complexity but also because the simple blackened chopper takes up so little space that the light beam organization of the present invention can be incorporated with maximum simplicity. This is not an absolute necessity in the present invention, which can also be used with thermographs having heated black body sources, but the preferred modification presents such great simplification and marked cost reduction that it is desirable.

One of the important new fields for thermography is in medical diagnosis where pictures are taken of the skin. Such a use normally occurs in a rather limited range of temperatures, both of the environment and of the object. Also the environment is quite stable, for example a hospital room is normally kept at the same temperature with a considerable degree of reliability. Under such circumstances an ambient temperature black body reference source which is represented by the preferred embodiment of the present invention in which the backs of the chopper blades are blackened gives thoroughly adequate results and so the present invention can be used even with an internally generated gray scale such as the one described in the Astheimer and Wormser patent. However, where, for example, thermograms are to be taken with very greatly differing average temperatures, the accuracy obtainable with an ambient temperature black body source is sometimes not adequate. Of course, it is always possible, if room permits in the particular instrument, to incorporate a thermostated black body source. However, this involves greater complication, additional elements, additional power requirements and more elements which can involve a maintenance problem. It is accordingly less desirable.

It is possible to achieve accuracies and range of temperatures of the objects to be thermographed without using a thermostated black body source. All that is required is an external gray scale source with a series of surfaces at the particular temperatures chosen. The external gray scale is thermographed at the edge of a picture and so passes through the same optics and is compared to the same ambient temperature black body as the scene which is actually thermographed. This modification may be used with advantage in the present invention but forms no part thereof being the subject matter of a copending application of Schwarz and Banca, Serial No. 272,477, filed April 11, 1963.

The present invention depends on a dichroic mirror. For infrared work, particularly for medical infrared work where peak infrared radiation is around 9 or 10$\mu$, germanium is the material of choice and, therefore, constitutes a preferred embodiment. However, it makes no difference to the principles of the present invention what the dichroic mirror is composed of so long as it reflects short wave radiation of a suitable range and passes long wave radiation of a suitable range. Therefore, in its broadest aspects the present invention includes other materials for a dichroic mirror. An example of another mirror material is silicon.

We claim:

1. In an infrared thermograph including an infrared detector, means for imaging the detector onto the plane of the scene to be thermographed, said imaging means including focusing optics and means for scanning the image of the detector across the scene to be thermographed in the form of a raster, the improvement which comprises, (a) a dichroic mirror on the optical axis and inclined thereto between the infrared detector and the scanning means, said mirror reflecting shorter radiations, including radiations in the visible spectrum, and passing longer wave infrared radiations, (b) a source of visible light, means for producing a beam striking the inclined dichroic mirror at an angle to be reflected along the optical axis in the direction of the scanning means of the thermograph, said source being located the same distance from the dichroic mirror as the infrared detector and producing a beam of light having a divergence equal to the convergence of the infrared radiation striking the detector whereby when the light beam is focused to a sharp image in the plane of the scene to be thermographed the infrared detector is also sharply imaged, and (c) means for periodically interrupting the infrared beam to the detector and producing radiation striking the detector from a reference source.

2. A thermograph according to claim 1 in which the interrupting means is a chopper with blackened rear blade surfaces.

3. A thermograph according to claim 2 in which the dichroic mirror is a thin plate of germanium.

References Cited in the file of this patent

UNITED STATES PATENTS

| | | |
|---|---|---|
| 2,974,230 | Harris | Mar. 7, 1961 |
| 2,979,622 | Garbuny | Apr. 11, 1961 |
| 3,007,053 | Merlen | Oct. 31, 1961 |
| 3,035,175 | Christensen | May 15, 1962 |